United States Patent
Zhou et al.

(10) Patent No.: US 10,586,027 B2
(45) Date of Patent: Mar. 10, 2020

(54) METHOD, DEVICE AND SYSTEM FOR SHARING CROSS-PLATFORM ACCOUNT RESOURCES

(71) Applicant: TENCENT TECHNOLOGY (SHENZHEN) COMPANY LIMITED, Shenzhen (CN)

(72) Inventors: Hongfei Zhou, Shenzhen (CN); Jia Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 249 days.

(21) Appl. No.: 15/671,194

(22) Filed: Aug. 8, 2017

(65) Prior Publication Data
US 2017/0337361 A1 Nov. 23, 2017

Related U.S. Application Data

(63) Continuation of application No. PCT/CN2016/082749, filed on May 20, 2016.

(30) Foreign Application Priority Data

Jun. 16, 2015 (CN) .......................... 2015 1 0332767

(51) Int. Cl.
*G06F 21/31* (2013.01)
*H04L 29/06* (2006.01)
*H04L 29/08* (2006.01)

(52) U.S. Cl.
CPC .......... *G06F 21/31* (2013.01); *H04L 63/0807* (2013.01); *H04L 67/10* (2013.01); *H04L 67/306* (2013.01)

(58) Field of Classification Search
None
See application file for complete search history.

(56) References Cited

U.S. PATENT DOCUMENTS 10,277,632 B2* 4/2019 Ylonen ................. H04L 63/062
2011/0004753 A1* 1/2011 Gomi .................. H04L 63/0807
713/156
(Continued)

FOREIGN PATENT DOCUMENTS

CN 101150861 A 3/2008
CN 102065082 A 5/2011
(Continued)

OTHER PUBLICATIONS

D. Hardt, "The OAuth 2.0 Authorization Framework", Oct. 2012, http://tools.ietf.org/html/rfc6749, 76 pages.
(Continued)

Primary Examiner — Kambiz Zand
Assistant Examiner — Arezoo Sherkat
(74) Attorney, Agent, or Firm — Marshall, Gerstein & Borun LLP

(57) ABSTRACT

A method for sharing a cross-platform account resource is described. An authentication request carrying a user name, a password, and an ID of an APP resource server is transmitted to an account management server, based on a register account on the account management server; an authentication ticket corresponding to the APP resource server is received from the account managements server, and the authentication ticket is stored, in which the authentication ticket carries a user ID, an authorization key and a refresh key; a resource request is transmitted to the APP resource server, based on the user ID and the authorization key in the authentication ticket; an APP resource is received from the APP resource server, after the APP resource server requests
(Continued)

the account management server to verify the authentication ticket by using the user ID and the authorization key.

8 Claims, 8 Drawing Sheets

(56) References Cited

U.S. PATENT DOCUMENTS

| | | | |
|---|---|---|---|
| 2011/0307947 A1* | 12/2011 | Kariv | H04L 63/08 726/9 |
| 2012/0131660 A1* | 5/2012 | Dalzell | G06F 21/335 726/9 |
| 2014/0082715 A1* | 3/2014 | Grajek | H04L 63/083 726/8 |
| 2014/0189797 A1* | 7/2014 | Nori | H04L 63/0807 726/4 |
| 2014/0282961 A1 | 9/2014 | Dorfman et al. | |
| 2014/0304837 A1* | 10/2014 | Mogaki | G06F 21/33 726/28 |
| 2014/0310792 A1* | 10/2014 | Hyland | H04L 63/0861 726/8 |
| 2014/0380428 A1 | 12/2014 | Kobayashi | |
| 2015/0150106 A1* | 5/2015 | Lund | H04L 63/08 726/7 |
| 2015/0312038 A1* | 10/2015 | Palanisamy | H04L 9/3213 713/155 |
| 2016/0050193 A1* | 2/2016 | Kanov | H04W 12/06 726/7 |
| 2016/0134488 A1* | 5/2016 | Straub | G06F 21/44 726/4 |
| 2016/0134616 A1* | 5/2016 | Koushik | H04L 63/0807 726/9 |
| 2016/0259936 A1* | 9/2016 | Mukherjee | G06F 21/45 |
| 2017/0048252 A1* | 2/2017 | Straub | H04L 67/10 |
| 2017/0127276 A1* | 5/2017 | Koo | H04L 9/3226 |
| 2018/0026982 A1* | 1/2018 | Wei | H04W 4/10 726/4 |

FOREIGN PATENT DOCUMENTS

| | | |
|---|---|---|
| CN | 102238007 A | 11/2011 |
| CN | 103609090 A | 2/2014 |
| CN | 103795692 A | 5/2014 |
| CN | 103888451 A | 6/2014 |
| CN | 104869175 A | 8/2015 |

OTHER PUBLICATIONS

Office Action in CN Application No. 201510332767.9 dated Sep. 25, 2017, 6 pages.

Search Report in International Application No. PCT/CN2016/082749 dated Aug. 16, 2016, 5 pages.

* cited by examiner

METHOD, DEVICE AND SYSTEM FOR SHARING CROSS-PLATFORM ACCOUNT RESOURCES

This application is a continuation of International Application No. PCT/CN2016/082749 filed May 20, 2016, which claims the benefit of and priority to Chinese Patent Application No. 201510332767.9 filed Jun. 16, 2015, by Tencent Technology (Shenzhen) Co., Ltd. and entitled "Method, Device and System for Sharing Cross-platform Account Resources", the entire respective disclosures of which are incorporated herein by reference.

TECHNICAL FIELD

The present disclosure relates to Internet technologies, and more particularly, to a method, a device and a system for sharing cross-platform account resources.

BACKGROUND

In current Internet applications, an Application (APP) of each intelligent terminal, such as, an APP of each TV box in the Over the Top (OTT) market, supports an account login of the APP within one APP. The involved account login system is basically closed. That is, on the basis of an APP, a closed user login system is designed, according to a user name and a password of the APP.

In this case, since an account system of each APP is independent, when a user enters each APP, different user names and passwords need to be re-input, which increases number and duration of a login operation. Besides, since it is necessary to create a login system for each APP independently, user data maintenance, technical implementations and development process of each APP are complicated with higher costs. In addition, a closed account system means a lack of social relationship data. Users need to re-establish a social relationship on each APP, and maintain a relationship chain thereof, it is hard for users to share information and communicate with each other. An existing account system needs to be independently logged on by each platform, and login state cannot be communicated among multiple platforms. It is very difficult for the background of an intelligent terminal to analyze user data on multiple platforms, due to the independent and closed account login system.

SUMMARY

Embodiments of the present disclosure provide a method, a device and a system for sharing cross-platform account resources, so as to implement a cross-platform login, simplify and unify login operations of users, reduce costs of maintenance and development.

An embodiment of the present disclosure provides a method for sharing cross-platform account resource, which is applied to a terminal device, including:

transmitting an authentication request to an account management server, based on a register account of the account management server, wherein the authentication request carries a user name, a password, and an ID of an APP resource server;

receiving an authentication ticket corresponding to the APP resource server from the account management server, and storing the authentication ticket, wherein the authentication ticket carries a user ID, an authorization key and a refresh key;

transmitting a resource request to the APP resource server, based on the user ID and the authorization key in the authentication ticket; and, receiving an APP resource from the APP resource server, after the APP resource server requests the account management server to verify the authentication ticket by using the user ID and the authorization key.

An embodiment of the present disclosure provides a method for sharing a cross-platform account resource, which is applied to an account management server, including:

receiving an authentication request from a terminal device, wherein the authentication request carries a user name, a password, and an ID of an APP resource server;

when determining that a register account with the user name and the password is stored in the account management server, generating an authentication ticket corresponding to the APP resource server for the terminal device, storing the authentication ticket and returning the authentication ticket to the terminal device, wherein the authentication ticket carries a user ID, an authorization key and a refresh key;

receiving a verification request from the APP resource server, wherein the verification request carries the user ID and the authorization key;

verifying the user ID and the authorization key, by using the corresponding authentication ticket stored in the account management server;

when the user ID and the authorization key are valid, confirming that a verification is passed; otherwise, confirming that the verification is failed; and, returning a verification result to the APP resource server.

An embodiment of the present disclosure provides a method for sharing a cross-platform account resource, which is applied to an APP resource server, including:

receiving a resource request carrying a user ID and an authorization key from a terminal device;

transmitting a verification request carrying the user ID and the authorization key to an account management server;

receiving a verification success indication, or a verification failure indication from the account management server;

when receiving the verification success indication, transmitting a corresponding APP resource to the terminal device;

when receiving the verification failure indication, returning a ticket error indication to the terminal device.

An embodiment of the present disclosure provides a device for sharing a cross-platform account resource, which is applied to a terminal device, including a processor and a memory; wherein the memory stores application program modules executable by the processor, and the application program modules include an authentication request transmitting module, an authentication ticket receiving module, a resource request transmitting module, a resource feedback receiving module and a storing module, the authentication request transmitting module is configured to transmit an authentication request to an account management server, based on a register account on the account management server, wherein the authentication request carries a user name, a password, and an ID of an APP resource server;

the authentication ticket receiving module is configured to receive an authentication ticket corresponding to the APP resource server from the account management server, and store the authentication ticket into the storing module, wherein the authentication ticket carries a user ID, an authorization key and a refresh key;

the storing module is configured to store an authentication ticket corresponding to each APP resource server;

the resource request transmitting module is configured to transmit a resource request to the APP resource server, based on the user ID and the authorization key in the authentication ticket; and, the resource feedback receiving module is configured to receive an APP resource from the APP resource server, after the APP resource server requests the account management server to verify the authentication ticket by using the user ID and the authorization key.

An embodiment of the present disclosure provides a device for sharing a cross-platform account resource, which is applied to an account management server, including a processor and a memory, wherein the memory stores application program modules executable by the processor, and the application program modules include a storing module, an authentication request receiving module, an authentication ticket generating module, an authentication ticket transmitting module, a verification request receiving module, a verification processing module and a verification result transmitting module, wherein the storing module is configured to store a register account of a terminal device, and an authentication ticket corresponding to each APP resource server, wherein the register account includes a user name and a password;

the authentication request receiving module is configured to receive an authentication request from the terminal device, wherein the authentication request carries a user name, a password and an ID of an APP resource server;

when determining that the storing module stores the register account carrying the user name and the password, the authentication ticket generating module is configured to generate an authentication ticket corresponding to the APP resource server for the terminal device, and store the authentication ticket into the storing module, wherein the authentication ticket carries a user ID, an authorization key and a refresh key;

the authentication ticket transmitting module is configured to transmit the authentication ticket to the terminal device, wherein the authentication ticket is generated by the authentication ticket generating module;

the verification request receiving module is configured to receive a verification request from the APP resource server, wherein the verification request carries the user ID and the authorization key;

the verification processing module is configured to verify the user ID and the authorization key, by using the corresponding authentication ticket stored in the account management server, when the user ID and the authorization key are valid, the verification processing module is further configured to confirm that a verification is passed; when the user ID and the authorization key are invalid, the verification processing module is further configured to confirm that the verification is failed; and, the verification result transmitting module is configured to transmit a verification result to the APP resource server, wherein the verification result is obtained by the verification processing module.

An embodiment of the present disclosure provides a device for sharing a cross-platform account resource, which is applied to an APP resource server, wherein the device includes a processor and a memory, the memory stores application program modules executed by the processor, and the application program modules include a resource request receiving module, a verification request transmitting module, a verification result receiving module and a resource request feedback module, wherein the resource request receiving module is configured to receive a resource request from a terminal device, wherein the resource request carries a user ID and an authorization key;

the verification request transmitting module is configured to transmit a verification request to an account management server, wherein the verification request carries the user ID and the authorization key;

the verification result receiving module is configured to receive a verification success indication, or a verification failure indication from the account managements server; and, the resource request feedback module is configured to transmit an APP resource to the terminal device, when receiving the verification success indication; and return a ticket error indication to the terminal device, when receiving the verification failure indication.

An embodiment of the present disclosure provides a system for sharing a cross-platform account resource, including a terminal device, an account management server, and an APP resource server, wherein the terminal device includes the foregoing device for sharing a cross-platform account resource, which is applied to a terminal device;

the account management server includes the foregoing device for sharing a cross-platform account resource, which is applied to an account management server; and, the APP resource server includes the foregoing device for sharing a cross-platform account resource, which is applied to an APP resource server.

BRIEF DESCRIPTIONS OF THE DRAWINGS

To clearly describe technical solutions of embodiments in the present disclosure, brief introductions will be provided for attached figures used when describing the embodiments. It is obvious that the attached figures in the following descriptions only illustrate some embodiments in the present disclosure. Persons having ordinary skill in the art may obtain other figures based on these attached figures, without paying creative work.

DETAILED DESCRIPTIONS

To make objectives, technical solutions and advantages of the present disclosure more clear, detailed descriptions are provided for the present disclosure in the following, accompanying with embodiments.

Figure 1:
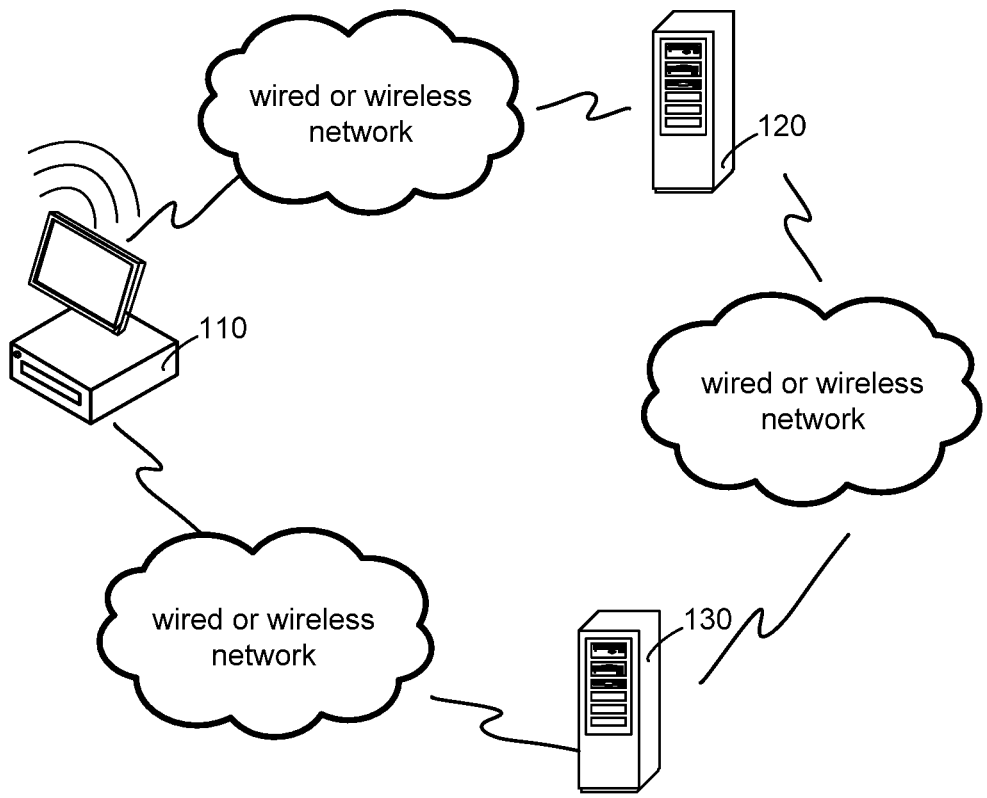
FIG. 1 is a schematic diagram illustrating a structure of an implementation environment, which is related with each embodiment in the present disclosure.

FIG. 1 is a schematic diagram illustrating a structure of an implementation environment, which is related with each embodiment of the present disclosure. As shown in FIG. 1, the implementation environment includes a terminal device 110, an account management server 120 and an APP resource server 130.

The terminal device 110 may be an intelligent set-top box, an intelligent TV, another piece of intelligent furniture, and so on.

The account management server 120 and the APP resource server 130 may be respectively a server, or a server cluster including several servers, or a cloud computing service center.

The terminal device 110 and the account management server 120 may be connected via a wireless network, or a wired network. The terminal device 110 and the APP resource server 130 may be connected via a wireless network, or a wired network. The account management server 120 and the APP resource server 130 may be connected via a wireless network, or a wired network.

Figure 2:
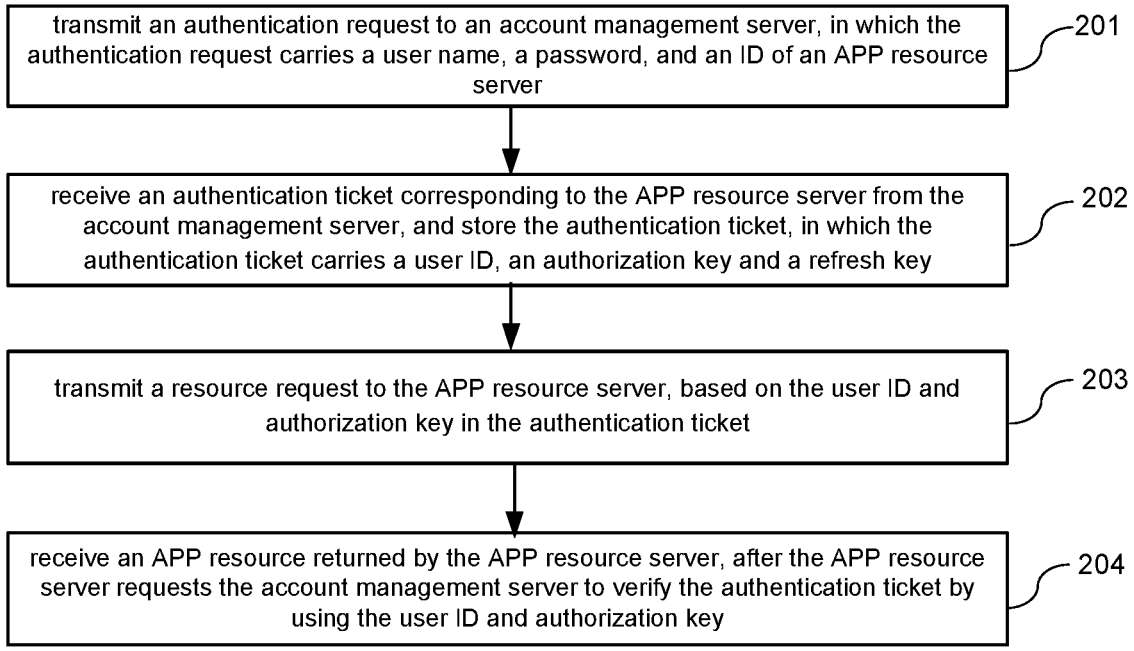
FIG. 2 is a flowchart illustrating a method for sharing a cross-platform account resource, in accordance with an embodiment of the present disclosure.

FIG. 2 is a flowchart illustrating a method for sharing a cross-platform account resource, in accordance with an embodiment of the present disclosure. The method is mainly applied to a terminal device. As shown in FIG. 2, the method may include the following blocks.

In block 201, an authentication request carrying a user name, a password, and an ID of an APP resource server is transmitted to an account management server, according to a register account on the account management server.

In the embodiment, before block 201, an account register on the account management server may be completed, by interacting with the account management server in advance. Register information of the account register includes a user name and a password, and may further include information, such as, an email address.

Correspondingly, the operation in block 201 may be triggered, when firstly receiving a resource request instruction for an APP from a user; or, the operation in block 201 may be triggered, when an authentication ticket obtained in block 202 last time is invalid; still or, the operation in block 201 may be triggered, when a ticket error indication is returned in block 204 last time. The user name and password may be input by the user. The ID of the APP resource server may be automatically obtained, when the user clicks on the APP.

When receiving the authentication request, the account management server determines whether a register account with the user name and password is stored locally. When determining that the register account with the user name and password is stored locally, the account management server generates an authentication ticket corresponding to the APP resource server for the terminal device, in which the authentication ticket carries the user ID, an authorization key and a refresh key. And then, the account management server returns the authentication ticket to the terminal device, and stores the authentication ticket. When determining that the register account with the user name and password is not stored locally, the account management server returns an authentication failure notification to the terminal device. When receiving the authentication failure notification from the account management server, the terminal device may re-input a correct user name, and password information. Alternatively, when the user forgets the user name and the password, or register is not completed previously, the user interacts with the account management server to register, and then block 201 is executed once again.

In block 202, the authentication ticket corresponding to the APP resource server is received from the account management server, and then is stored, in which the authentication ticket carries the user ID, the authorization key and the refresh key.

The user ID is a unique identity for the user of the terminal device. The terminal device requests the APP resource sever to provide various kinds of user data and interfaces, by using the user ID and the authorization key. The terminal device takes the user ID as the unique identity of the user, and reports user data, e.g., reports data to the account management server, or reports data to the APP resource server, and so on, so as to perform data mining in depth for the user.

In block 203, a resource request is transmitted to the APP resource server, based on the user ID and authorization key in the authentication ticket.

In the embodiment, before block 203, the terminal device may firstly receive the resource request instruction for the APP from the user, and determine whether the authentication ticket corresponding to the APP resource server is stored locally. When determining that the authentication ticket corresponding to the APP resource server is stored locally, block 203 is executed; otherwise, the terminal device may inform the user that there is no authentication ticket currently, and indicate the user to log on or register. And then, block 201 may be executed, based on the login instruction of the user. Alternatively, the terminal device transmits a register request with register information to the account management server, based on the register instruction of the user. The register information includes the user name and password.

Furthermore, in the embodiment, the account management server may further respectively set a valid period for the authorization key and refresh key in the authentication ticket. The valid period of the refresh key is longer than that of the authorization key. Correspondingly, when transmitting the authentication ticket in block 202, the authentication ticket also carries valid period information of the authorization key and refresh key.

Correspondingly, after determining that the authentication ticket corresponding to the APP resource server is stored locally, before executing block 203, the method may further include the following blocks. Determine whether the authorization key of the authentication ticket is within the valid period. When the authorization key is within the valid period, proceed with block 203. When the authorization key is not within the valid period, further determine whether the refresh key of the authentication ticket is within the valid period. When the refresh key is within the valid period, transmit a ticket refresh request carrying the user ID and refresh key to the account management server, receive the authentication ticket corresponding to the APP resource server from the account management server, and store the authentication ticket. The authentication ticket includes the user ID, the authorization key and the refresh key. When the refresh key is not within the valid period, proceed with block 201.

After receiving the resource request, the APP resource server may transmit a verification request carrying the user ID and authorization key to the account management server. The account management server may verify the user ID and authorization key, by using the corresponding authentication ticket stored therein. When the user ID and the authorization key are valid, the account management server confirms that the verification is passed; otherwise, the account management server confirms that the verification is failed. The account management server returns a verification result to the APP resource server. When receiving a verification success indication, the APP resource server may transmit a corresponding APP resource to the terminal device. When receiving a verification failure indication, the APP resource server may return a ticket error indication to the terminal device.

The account management server may respectively compare the user ID and authorization key with the user ID and authorization key in the corresponding authentication ticket stored locally, when they are the same, the account management server confirms that the user ID and authorization key are valid; otherwise, the account management server confirms that the user ID and authorization key are invalid.

Furthermore, if the authorization key and refresh key respectively have a valid period, when the account management server compares the user ID and authorization key with the user ID and authorization key in the corresponding authentication ticket stored therein, if they are the same and the authorization key is within the valid period, the account management server confirms that the user ID and authorization key are valid; otherwise, the account management server confirms that the user ID and authorization key are invalid. When confirming that the user ID and authorization key are invalid, the account management server further determines whether the refresh key in the corresponding authentication ticket is within the valid period. If the refresh key is within the valid period, the account management server may generate a ticket error code indicating overtime of the authorization key. If the refresh key is not within the valid period, the account management server may generate a ticket error code indicating overtime of the refresh key.

Furthermore, the APP resource server returns the ticket error indication to the terminal device. The ticket error indication may carry a corresponding ticket error code.

In block 204, the APP resource returned by the APP resource server is received, after the APP resource server requests the account management server to verify the authentication ticket, by using the user ID and authorization key. Subsequently, the terminal device may present the received APP resource.

Furthermore, when receiving the ticket error indication returned by the APP resource server, after the APP resource server request the account management server to verify the authentication ticket by using the user ID and authorization key, the terminal device may execute block 201 based on the ticket error indication, or transmit a ticket refresh request carrying the user ID and refresh key to the account management server, further receive an authentication ticket carrying the user ID, a new authorization key and a new refresh key from the account management server, and store the authentication ticket.

Specifically, when the ticket error indication carries a ticket error code, the terminal device may determine to execute block 201, based on the indication of the ticket error code, or execute the operation of transmitting the ticket refresh request to the account management server. That is, when the ticket error code indicates that the authorization key is overtime, the terminal device may execute the operation of transmitting the ticket refresh request to the account management server. When the ticket error code indicates that the refresh key is overtime, the terminal device may execute block 201. When the ticket error indication does not carry the ticket error code, the terminal device may determine whether the refresh key in the authentication ticket stored therein is within the valid period. If the refresh key is within the valid period, the terminal device transmits the ticket refresh request carrying the user ID and refresh key to the account management server, receives the authentication ticket corresponding to the APP resource server from the account management server, and stores the authentication ticket. The authentication ticket carries the user ID, the authorization key and the refresh key. If the refresh key is not within the valid period, proceed with block 201.

In the embodiment, when transmitting the ticket refresh request to the account management server, if the account management server verifies that the user ID and refresh key in the ticket refresh request are invalid, the account management server returns a refresh failure indication to the terminal device. Based on such refresh failure indication, the terminal device may re-transmit an authentication request to the account management server, that is, proceed with block 201.

Figure 3:
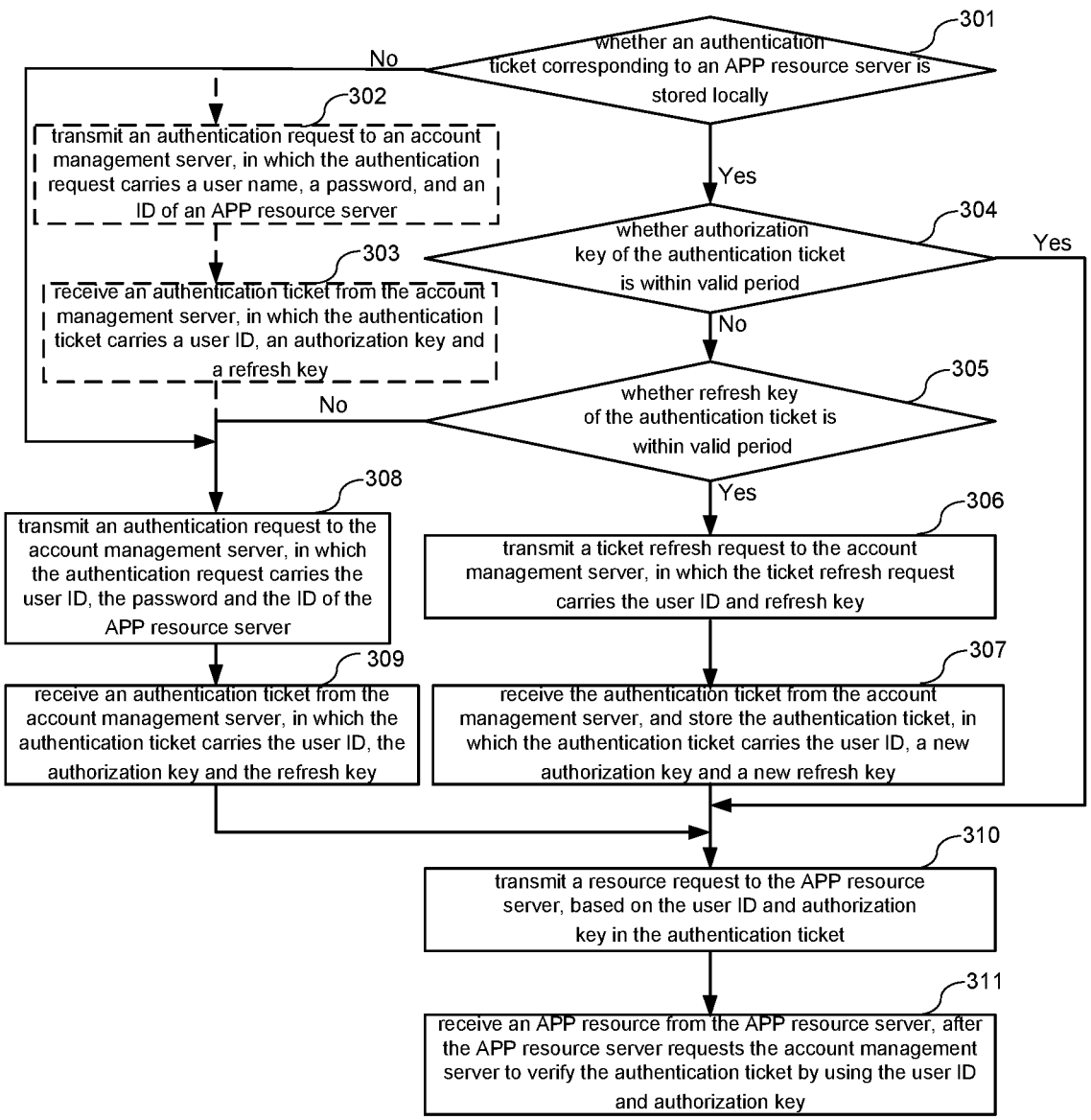
FIG. 3 is a flowchart illustrating a method for sharing a cross-platform account resource, in accordance with an example of the present disclosure.

FIG. 3 is a flowchart illustrating a method for sharing a cross-platform account resource, in accordance with an example of the present disclosure. The method illustrated with FIG. 3 is applied to a terminal device. As shown in FIG. 3, the method may include the following blocks.

In block 301, when receiving a resource request instruction for an APP from a user, a terminal device determines whether an authentication ticket for an APP resource server is stored locally, if no authentication ticket for the APP resource server is stored locally, proceed with block 302 or 308; otherwise, proceed with block 304.

In block 302, the terminal device transmits a register request carrying account register information to an account management server, in which the account register information includes a user name and a password.

In block 303, the terminal device receives a register success indication from the account management server, and then block 308 is executed.

In block 304, the terminal device determines whether an authorization key in the authentication ticket is within a valid period, if not, block 305 is executed; otherwise, block 310 is executed.

In block 305, the terminal device determines whether a refresh key in the authentication ticket is within a valid period, if yes, block 306 is executed; otherwise, block 308 is executed.

In block 306, the terminal device transmits a ticket refresh request carrying a user ID and refresh key to the account management server.

In block 307, the terminal device receives an authentication ticket from the account management server, and stores the authentication ticket. The authentication ticket carries the user ID, a new authorization key and a new refresh key. Subsequently, proceed with block 310.

In block 308, the terminal device transmits an authentication request carrying the user name, the password and the ID of the APP resource server, to the account management server.

In block 309, the terminal device receives the authentication ticket carrying the user ID, the authorization key and refresh key from the account management server. And then, proceed with block 310.

In block 310, the terminal device transmits a resource request to the APP resource server, based on the user ID and authorization key in the authentication ticket.

In block 311, the terminal device receives an APP resource from the APP resource server, after the APP resource server requests the account management server to verify the authentication ticket by using the user ID and the authorization key.

Figure 4:
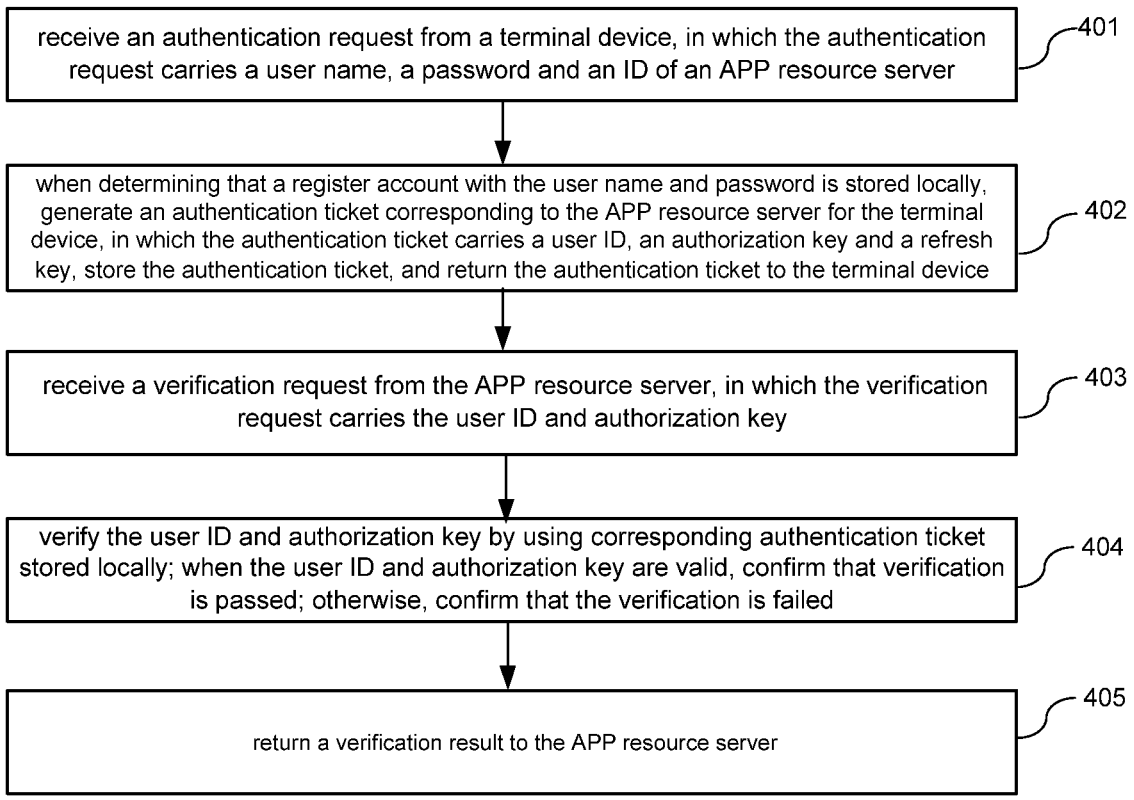
FIG. 4 is a flowchart illustrating a method for sharing a cross-platform account resource, in accordance with an embodiment of the present disclosure.

FIG. 4 is a flowchart illustrating a method for sharing a cross-platform account resource, in accordance with an embodiment of the present disclosure. The method is mainly applied to an account management server. As shown in FIG. 4, the method includes the following blocks.

In block 401, an account management server receives an authentication request carrying a user name, a password and an ID of an APP resource server, from a terminal device.

In the embodiment, before block 401, the account management server may interact with the terminal device in advance, and complete an account register for the terminal device on the account management server. That is, the account management server receives a register request from the terminal device. The register request includes register information, such as, a user name and a password. The register request may further carry information, such as an email address. And then, the account management server stores a register account corresponding to the register information, and returns a register complete indication to the terminal device.

In block 402, when determining that the register account with the user name and password is stored locally, the account management server generates an authentication ticket corresponding to the APP resource server for the terminal device, in which the authentication ticket includes the user ID, an authorization key and a refresh key. The account management server stores the authentication ticket, and returns the authentication ticket to the terminal device.

In the block, the account management server may determine whether the register account with the user name and password is stored locally, if yes, the account management server generates the authentication ticket corresponding to the APP resource server for the terminal device, in which the authentication ticket carries the user ID, the authorization key and the refresh key, the account management server stores the authentication ticket, and returns the authentication ticket to the terminal device; otherwise, the account management server returns an authentication failure notification to the terminal device.

After receiving the authentication failure notification, the terminal device may re-input a correct user name, and password information. Alternatively, when the user forgets the user name and password, or register is not completed in advance, the terminal device may interact with the account management server to register. Subsequently, proceed with block 401.

Furthermore, the account management server may respectively set a valid period for the authorization key and refresh key in the authentication ticket, meanwhile the valid period of the refresh key is longer than that of the authorization key. Correspondingly, when transmitting the authentication ticket in the block, the authentication ticket also carries valid period information of the authorization key and the refresh key.

In block 403, the account management server receives a verification request from the APP resource server, which carries the user ID and the authorization key.

In block 404, the account management server verifies the user ID and authorization key, by using the corresponding authentication ticket stored in the account management server. When the user ID and authorization key are valid, the account management server confirms that the verification is passed; otherwise, the account management server confirms that the verification is failed.

In the block, the account management server compares the user ID and authorization key with the user ID and authorization key of the corresponding authentication ticket stored therein, when they are the same, the account management server confirms that the user ID and authorization key are valid; otherwise, the account management server confirms that the user ID and authorization key are invalid.

Furthermore, if the authorization key and refresh key respectively possess a valid period, in the block, when the account management server compares the user ID and authorization key with the user ID and authorization key in the corresponding authentication ticket stored therein, if they are the same, and the authorization key is within the valid period, the account management server confirms that the user ID and authorization key are valid; otherwise, the account management server confirms that the user ID and authorization key are invalid.

In the embodiment, when confirming that the user ID and authorization key are invalid, the account management server further determines whether the refresh key in the authentication ticket is within the valid period. When the refresh key is within the valid period, the account management server may generate a ticket error code indicating that the authorization key is overtime. When the refresh key is not within the valid period, the account management server may generate a ticket error code indicating that the refresh key is overtime.

In block 405, the account management server returns a verification result to the APP resource server.

In the block, when confirming that the verification is passed, the account management server may return a verification success indication to the APP resource server. When confirming that the verification is failed, the account management server may return a verification failure indication to the APP resource server.

In the block, the verification failure indication may further include a corresponding ticket error code.

In addition, the embodiment may further include the following blocks. The account management server receives a ticket refresh request from the terminal device, which carries the user ID and refresh key. The account management server verifies the user ID and refresh key, by using the corresponding authentication ticket stored therein. When the user ID and refresh key are valid, the account management server generates the authentication ticket corresponding to the APP resource server for the terminal device, in which the authentication ticket carries the user ID, a new authorization key and a new refresh key. The account management server stores the authentication ticket, and returns the authentication ticket to the terminal device.

Specifically, the account management server may compare the user ID and refresh key with user ID and refresh key in the corresponding authentication ticket stored therein, when they are the same, the account management server confirms that the user ID and refresh key are valid; otherwise, the account management server confirms that the user ID and refresh key are invalid.

Furthermore, if the authorization key and refresh key respectively possess a valid period, when the account management server compares the user ID and refresh key with user ID and refresh key in the corresponding authentication ticket stored therein, if they are the same, and the refresh key is within the valid period, the account management server confirms that the user ID and refresh key are valid; otherwise, the account management server confirms that the user ID and refresh key are invalid. When confirming that the refresh key is invalid, the account management server returns a refresh failure indication to the terminal device. Correspondingly, the terminal device may re-transmit the authentication request to the account management server, based on the refresh failure indication. That is, proceed with block 201.

Figure 5:
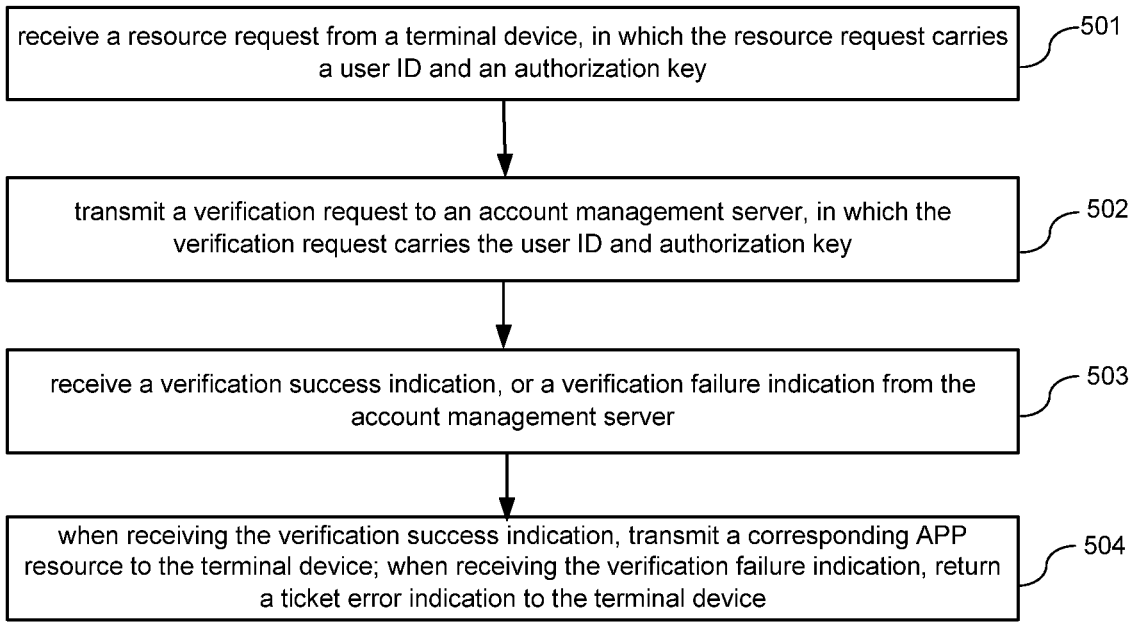
FIG. 5 is a flowchart illustrating a method for sharing a cross-platform account resource, in accordance with an embodiment of the present disclosure.

FIG. 5 is a flowchart illustrating a method for sharing a cross-platform account resource, in accordance with an embodiment of the present disclosure. The method is mainly applied to an APP resource server. As shown in FIG. 5, the method may include the following blocks.

In block 501, an APP resource server receives a resource request from a terminal device, which carries a user ID and an authorization key.

In block 502, the APP resource server transmits a verification request to an account management server, which carries the user ID and authorization key.

After receiving the verification request, the account management server verifies the user ID and authorization key, by using a corresponding authentication ticket stored therein. When the user ID and authorization key are valid, the account management server confirms that the verification is passed, and returns a verification success indication to the APP resource server; otherwise, the account management server confirms that the verification is failed, and returns a verification failure indication to the APP resource server.

Specifically, the account management server may compare the user ID and authorization key with user ID and authorization key in the corresponding authentication ticket stored therein, when they are the same, the account management server confirms that the user ID and authorization key are valid; otherwise, the account management server confirms that the user ID and authorization key are invalid.

Furthermore, if the authorization key and refresh key respectively possess a valid period, when the account management server compares the user ID and authorization key with user ID and authorization key in the corresponding authentication ticket stored therein, if they are the same, and the authorization key is within the valid period, the account management server confirms that the user ID and authorization key are valid; otherwise, the account management server confirms that the user ID and authorization key are invalid.

In the embodiment, when confirming that the user ID and authorization key are invalid, the account management server may further determine whether the refresh key in the corresponding authentication ticket is within the valid period, if the refresh key is within the valid period, the account management server may generate a ticket error code indicating that the authorization key is overtime; if the refresh key is not within the valid period, the account management server may generate a ticket error code indicating that the refresh key is overtime.

In block 503, the APP resource server receives a verification success indication, or a verification failure indication from the account management server.

In block 504, when receiving the verification success indication, the APP resource server transmits a corresponding APP resource to the terminal device; when receiving the verification failure indication, the APP resource server returns a ticket error indication to the terminal device.

Furthermore, the ticket error indication may include a ticket error code.

Figure 6:
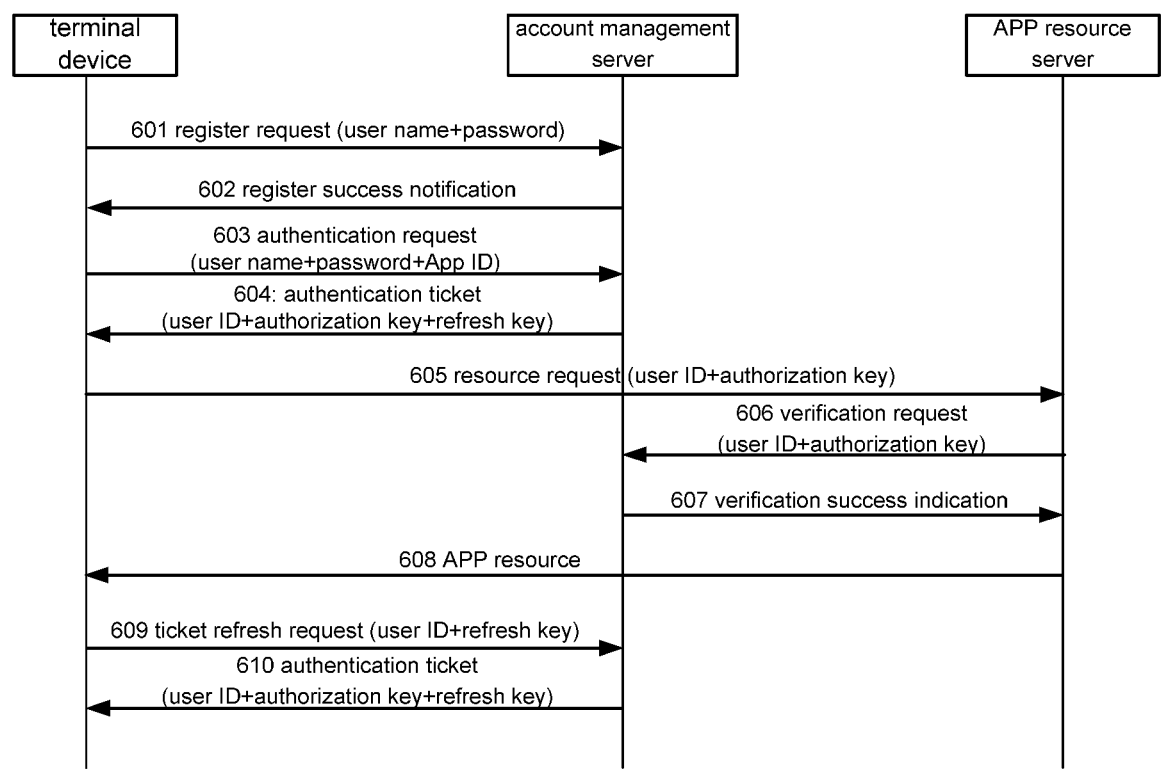
FIG. 6 is a flowchart illustrating a method for sharing a cross-platform account resource, in accordance with an example of the present disclosure.

FIG. 6 is a flowchart illustrating a method for sharing a cross-platform account resource, in accordance with an example of the present disclosure. The method in the example is applied to a system, which includes a terminal device 110, an account management server 120 and an APP resource server 130 shown in FIG. 1. As shown in FIG. 6, the method may include the following blocks.

In block 601, a terminal device transmits a register request to an account management server, in which the register request carries register information, such as, a user name and a password.

In block 602, after storing the register information, the account management server returns a register success notification to the terminal device.

In block 603, the terminal device transmits an authentication request to the account management server, in which the authentication request carries a user name, a password, an ID (which is referred to as an APP ID for short in FIG. 6) of an APP resource server requesting to access by a user currently.

In block 604, the account management server generates an authentication ticket for the terminal device, stores the authentication ticket and returns the authentication ticket to the terminal device, in which the authentication ticket includes a user ID, an authorization key and a refresh key.

In block 605, the terminal device transmits a resource request to the APP resource server, in which the resource request carries the user ID and authorization key in the authentication ticket.

In block 606, after receiving the resource request, the APP resource server transmits a verification request carrying the user ID and authorization key to the account management server.

In block 607, the account management server verifies the user ID and authorization key, based on the authentication ticket stored therein. After a successful verification, the account management server returns a verification success indication to the APP resource server.

In block 608, after receiving the verification success indication from the account management server, the APP resource server provides a corresponding APP resource for the terminal device.

In block 609, when the valid period of the authorization key in the authentication ticket expires, the terminal device transmits a ticket refresh request carrying the user ID and refresh key to the account management server.

In block 610, the account management server re-generates a new authorization key and a new refresh key for the terminal device, and returns an authentication ticket to the terminal device, in which the authentication ticket carries the user ID, the new authorization key and new refresh key.

Several device embodiments will be described in the following, which may be configured to execute corresponding method embodiments in the present disclosure. For details not disclosed in the device embodiments of the present disclosure, please refer to descriptions in the method embodiments of the present disclosure.

Figure 7:
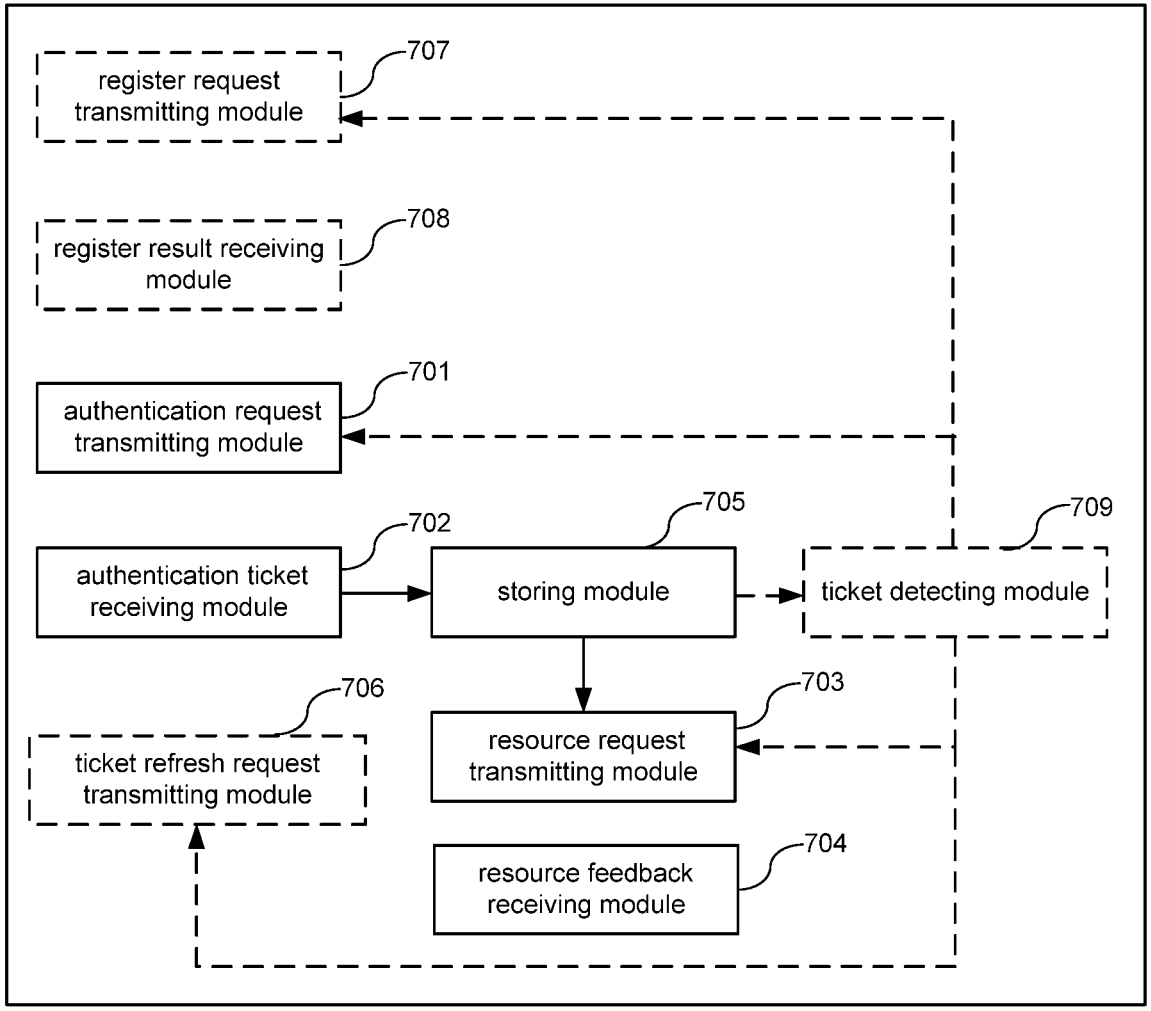
FIG. 7 is a schematic diagram illustrating a structure of a device for sharing a cross-platform account resource, in accordance with an embodiment of the present disclosure.

FIG. 7 is a schematic diagram illustrating a structure of a device for sharing a cross-platform account resource, in accordance with an embodiment of the present disclosure. The device may become a part of a terminal device, by using at least one of software and hardware. As shown in FIG. 7, the device may include an authentication request transmitting module 701, an authentication ticket receiving module 702, a resource request transmitting module 703, a resource feedback receiving module 704 and a storing module 705.

The authentication request transmitting module 701 is configured to transmit an authentication request to an account management server, based on a register account on the account management server. The authentication request carries a user name, a password, and an ID of an APP resource server.

The authentication ticket receiving module 702 is configured to receive an authentication ticket corresponding to the APP resource server from the account management server, and stores the authentication ticket into the storing module. The authentication ticket includes a user ID, an authorization key and a refresh key.

The storing module 705 is configured to store the authentication ticket corresponding to each APP resource server.

The resource request transmitting module 703 is configured to transmit a resource request to the APP resource server, based on the user ID and authorization key in the authentication ticket corresponding to the APP resource server stored in the storing module.

The resource feedback receiving module 704 is configured to receive an APP resource from the APP resource server, after the APP resource server requests the account management server to verify the authentication ticket, by using the user ID and authorization key.

In an implementation, the device may further include a ticket refresh request transmitting module 706. The ticket refresh request transmitting module 706 is configured to transmit a ticket refresh request carrying the user ID and refresh key to the account management server, so as to request the account management server to re-transmit an authentication ticket.

In an implementation, the resource feedback receiving module 704 is further configured to receive a ticket error indication from the APP resource server, after the APP resource server requests the account management server to verify the authentication ticket by using the user ID and authorization key. The resource feedback receiving module 704 is further configured to indicate the authentication request transmitting module 701 to transmit an authentication request, based on the ticket error indication, or indicate the ticket refresh request transmitting module 705 to transmit a ticket refresh request.

In an implementation, the device further includes a register request transmitting module 707 and a register result receiving module 708.

The register request transmitting module 707 is configured to transmit a register request carrying register information to the account management server, in which the register information includes a user name and a password.

The register result receiving module 708 is configured to receive register result information from the account management server.

In an implementation, the device further includes a ticket detecting module 709. The ticket detecting module 709 is configured to determine whether the storing module 705 stores the authentication ticket corresponding to the APP resource server, before the resource request transmitting module transmits the resource request to the APP resource server. When determining that the storing module 705 stores the authentication ticket corresponding to the APP resource server, before the resource request transmitting module transmits the resource request to the APP resource server, the ticket detecting module 709 is further configured to indicate the resource request transmitting module 703 to transmit the resource request to the APP resource server; otherwise, the ticket detecting module 709 is further configured to indicate the authentication request transmitting module 701 to transmit the authentication request to the account management server, or indicate the register request transmitting module 707 to transmit the register request to the account management server.

In an implementation, a valid period is respectively set for the authorization key and refresh key in the authentication ticket. The valid period of the refresh key is longer than that of the authorization key. Correspondingly, after determining that the storing module 705 stores the authentication ticket corresponding to the APP resource server, the ticket detecting module 709 is further configured to determine whether the authorization key in the authentication ticket is within the valid period, before indicating the resource request transmitting module to transmit the resource request to the APP resource server. When determining that the authorization key is within the valid period, the ticket detecting module 709 is further configured to indicate the resource request transmitting module 703 to transmit the resource request to the APP resource server. When determining that the authorization key is not within the valid period, the ticket detecting module 709 is further configured to determine whether the refresh key in the authentication ticket is within the valid period. If the refresh key is within the valid period, the ticket detecting module 709 is further configured to indicate the ticket refresh request transmitting module 706 to transmit the ticket refresh request to the account management server. If the refresh key is not within the valid period, the ticket detecting module 709 is further configured to indicate the authentication request transmitting module 701 to transmit the authentication request to the account management server.

Figure 8:
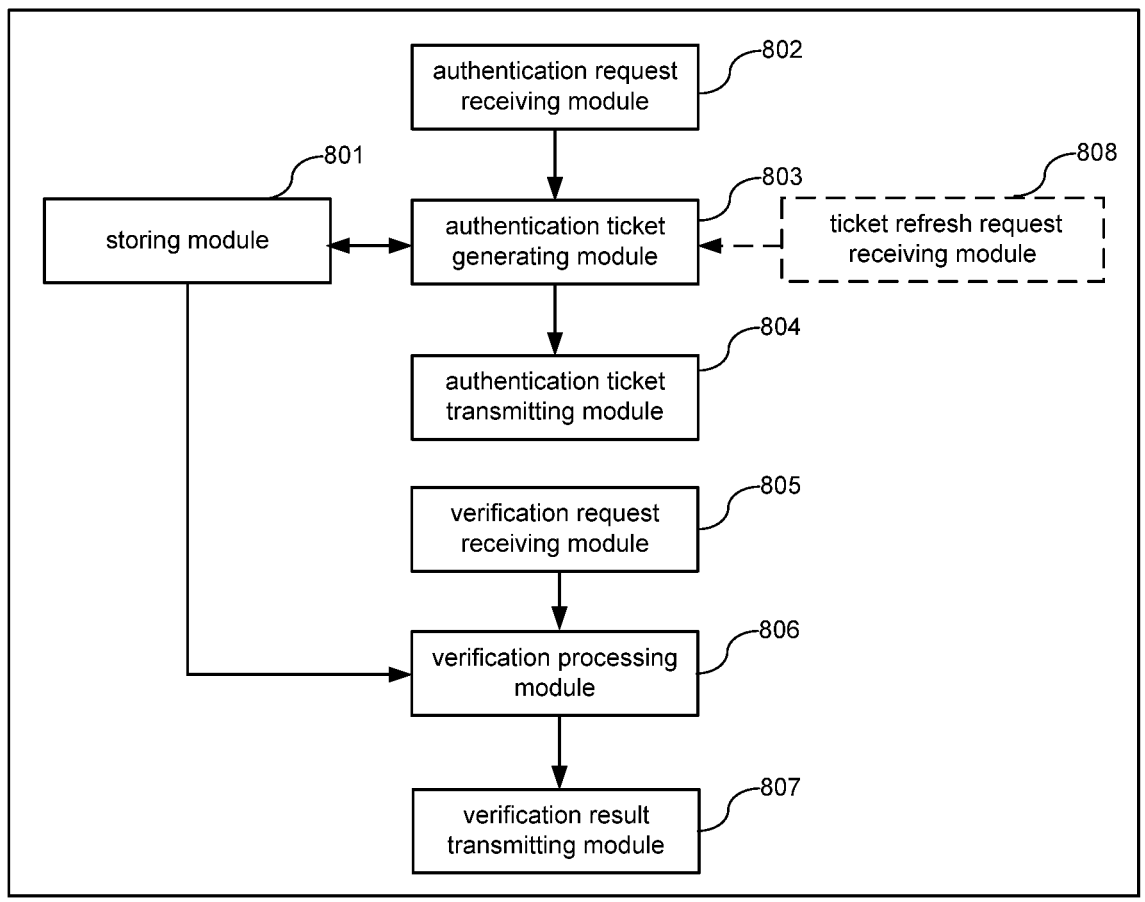
FIG. 8 is a schematic diagram illustrating a structure of a device for sharing a cross-platform account resource, in accordance with an embodiment of the present disclosure.

FIG. 8 is a schematic diagram illustrating a structure of a device for sharing a cross-platform account resource, in accordance with an embodiment of the present disclosure. The device may become a part or all components of an account management server, by using at least one of software and hardware. As shown in FIG. 8, the device may include a storing module 801, an authentication request receiving module 802, an authentication ticket generating module 803, an authentication ticket transmitting module 804, a verification request receiving module 805, a verification processing module 806, and a verification result transmitting module 807.

The storing module 801 is configured to store a register account of a terminal device, and an authentication ticket corresponding to each APP resource server, in which the register account includes a user name and a password.

The authentication request receiving module 802 is configured to receive an authentication request from the terminal device, in which the authentication request carries a user name, a password, and an ID of an APP resource server.

When determining that the storing module 801 stores a register account including the user name and password, the authentication ticket generating module 803 is configured to generate an authentication ticket corresponding to the APP resource server for the terminal device, and stores the authentication ticket into the storing module 801. The authentication ticket includes a user ID, an authorization key and a refresh key.

The authentication ticket transmitting module 804 is configured to transmit the authentication ticket to the terminal device, in which the authentication ticket is generated by the authentication ticket generating module.

The verification request receiving module 805 is configured to receive a verification request from the APP resource server, in which the verification request includes the user ID and the authorization key.

The verification processing module 806 is configured to verify the user ID and authorization key, by using the corresponding authentication ticket stored therein. When the user ID and authorization key are valid, the verification processing module 806 is further configured to confirm that the verification is passed; otherwise, the verification processing module 806 is further configured to confirm that the verification is failed.

The verification result transmitting module 807 is configured to transmit a verification result to the APP resource server, in which the verification result is obtained by the verification processing module.

In an implementation, the device may further include a ticket refresh request receiving module 808, which is configured to receive a ticket refresh request carrying the user ID and refresh key from the terminal device. Correspondingly, the verification processing module 806 is further configured to verify the user ID and refresh key, by using the corresponding authentication ticket stored therein. When the user ID and refresh key are valid, the ticket refresh request receiving module 808 is further configured to indicate the authentication ticket generating module to re-generate an authentication ticket for the terminal device.

In an implementation, a valid period is respectively set for the authorization key and refresh key in the authentication ticket, and valid period of the refresh key is longer than that of the authorization key. Correspondingly, when verifying the user ID and authorization key by using the corresponding authentication ticket stored therein, the verification processing module 806 is configured to compare the user ID and authorization key with user ID and authorization key in the corresponding authentication ticket stored therein, if they are the same, and the authorization key are within the valid period, the verification processing module 806 is further configured to confirm that the user ID and authorization key are valid; otherwise, the verification processing module 806 is further configured to confirm that the user ID and authorization key are invalid. When confirming that the authorization key is invalid, the verification processing module 806 is further configured to determine whether the refresh key of the authentication ticket is within the valid period. When the refresh key is within the valid period, the verification processing module 806 is further configured to generate a ticket error code indicating that the authorization key is overtime. When the refresh key is not within the valid period, the verification processing module 806 is further configured to generate a ticket error code indicating that the refresh key is overtime. At this time, the verification result indicating failed verification may include a corresponding ticket error code.

When verifying the user ID and refresh key by using the corresponding authentication ticket stored therein, the verification processing module 806 is further configured to compare the user ID and refresh key with the user ID and refresh key in the corresponding authentication ticket stored therein, if they are the same, and the refresh key is within the valid period, the verification processing module 806 is further configured to confirm that the user ID and refresh key are valid; otherwise, the verification processing module 806 is further configured to confirm that the user ID and refresh key are invalid.

In an implementation, the device may further include a register interface module 807, which is configured to receive a register request from the terminal device. The register request carries register information, which includes a user name and a password. The register interface module 807 is further configured to store a register account corresponding to the register information into the storing module 801, and return a register complete indication to the terminal device.

Figure 9:
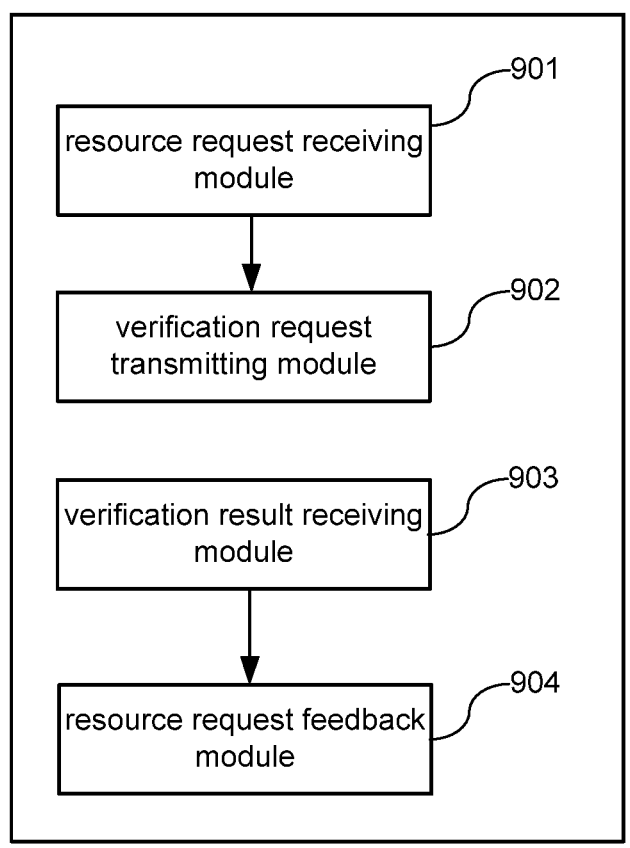
FIG. 9 is a schematic diagram illustrating a structure of a device for sharing a cross-platform account resource, in accordance with an embodiment of the present disclosure.

FIG. 9 is a schematic diagram illustrating a structure of a device for sharing a cross-platform account resource, in accordance with an embodiment of the present disclosure. The device may become a part or all components of an APP resource server, by using at least one of software and hardware. As shown in FIG. 9, the device may include a resource request receiving module 901, a verification request transmitting module 902, a verification result receiving module 903 and a resource request feedback module 904.

The resource request receiving module 901 is configured to receive a resource request from a terminal device, in which the resource request carries a user ID and an authorization key.

The verification request transmitting module 902 is configured to transmit a verification request to an account management server, in which the verification request carries the user ID and the authorization key.

The verification result receiving module 903 is configured to receive a verification success indication, or a verification failure indication from the account management server.

When receiving the verification success indication, the resource request feedback module 904 is configured to transmit a corresponding APP resource to the terminal device. When receiving the verification failure indication, the resource request feedback module 904 is further configured to return a ticket error code to the terminal device.

In accordance with an embodiment of the present disclosure, a system for sharing a cross-platform account resource includes a terminal device 110, an account management server 120 and an APP resource server 130 shown in FIG. 1.

The terminal device 110 includes a device for sharing a cross-platform account resource shown in FIG. 7. The account management server 120 includes a device for sharing a cross-platform account resource shown in FIG. 8. The APP resource server 130 includes a device for sharing a cross-platform account resource shown in FIG. 9.

Figure 10:
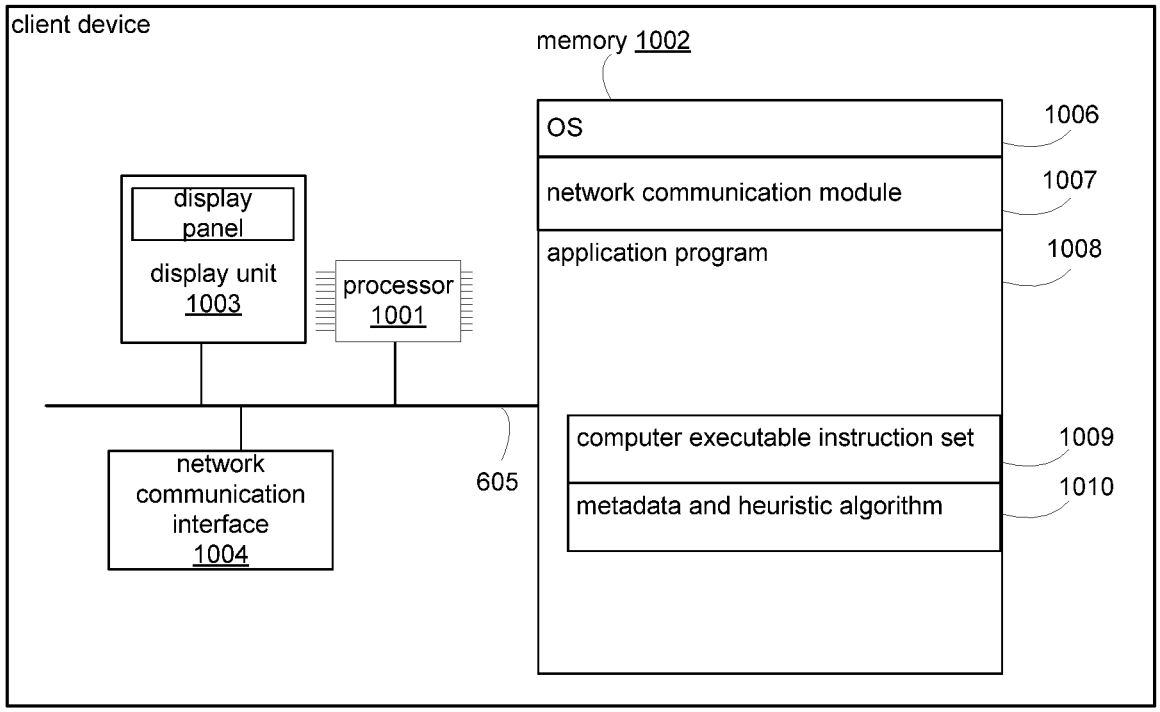
FIG. 10 is a schematic diagram illustrating a structure of a terminal device, in accordance with an embodiment of the present disclosure.

FIG. 10 is a schematic diagram illustrating a structure of a terminal device, in accordance with an embodiment of the present disclosure. The terminal device is configured to implement the method shown in FIG. 2, and the device shown in FIG. 6. As shown in FIG. 10, the terminal device may include a processor 1001, a non-transitory computer readable memory 1002, a display unit 1003, a network communication interface 1004. These components communicate with each other via a bus 1005.

In the embodiment, the memory 1002 stores multiple program modules, such as, an Operating System (OS) 1006, a network communication module 1007 and an application program 1008.

The processor 1001 may read each module (not shown in the figure) of the application program stored in the memory 1002, and execute each functional application and data processing of the terminal device. There may be at least one processor 1001 in the embodiment. The processor 1001 may be a central processing unit (CPU), a processing unit/module, an Application Specific Integrated Circuit (ASIC), a logic module, or, a programmable gate array, and so on.

The OS 1006 may include, without limitation, Android OS, Windows OS, apple iOS, apple Mac OS, and so on.

The application program 1008 may include a computer executable instruction set 1009, which consists of each functional module in the device shown in FIG. 7, a corresponding piece of metadata, and a heuristic algorithm 1010. These computer executable instruction sets may be executed by the processor 1001, and complete the method shown in FIG. 2, or functions of the device shown in FIG. 7.

In the embodiment, the network communication interface 1004 cooperates with the network communication module 1006, receives and transmits each network signal of the terminal device, e.g., a network data interaction with the account management server, and a network data interaction with the APP resource server, and so on.

The display unit 1003 possesses a display panel. The display panel is configured to complete input and display of relevant information, e.g., display information interacted with the account management server, display information interacted with the APP resource server, and so on.

Figure 11:
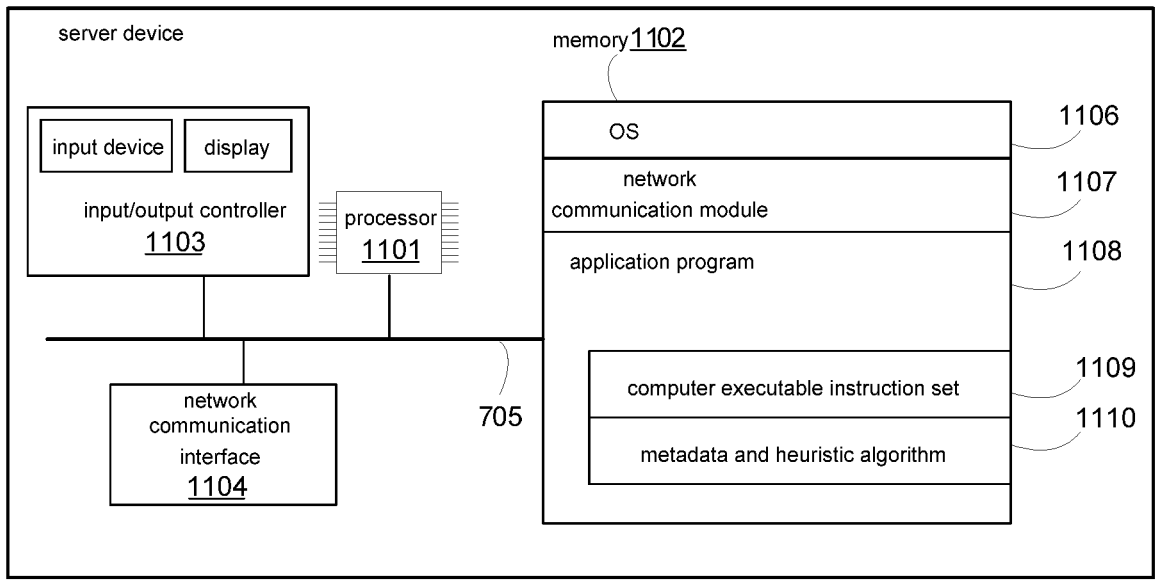
FIG. 11 is a schematic diagram illustrating a structure of a server device, in accordance with an embodiment of the present disclosure.

FIG. 11 is a schematic diagram illustrating a structure of a server device, in accordance with an embodiment of the present disclosure. As shown in FIG. 11, the server device may include a processor 1101, a non-transitory computer readable memory 1102, an input/output controller 1103, and a network communication interface 1104. These components communicate with each other via a bus 1105.

In the embodiment, the memory 1102 stores multiple program modules, e.g., an OS system 1106, a network communication module 1107 and an application program 1108.

The processor 1101 may read each module (not shown in the figure) in the application program of the memory 1102, so as to execute each functional application and data processing of the server device. In the embodiment, there may be at least one processor 1101. The processor 1101 may be a CPU, a processing unit/module, an ASIC, a logic module, or a programmable gate array.

The input/output controller 1103 possesses a display and an input device, which are configured to complete input, output and display of relevant data, and so on.

The OS 1106 includes, without limitation, Android OS, Symbian OS, Windows OS, Linux OS, and so on.

The application program 1108 may include an account management server module. The account management server module includes a computer executable instruction set 1109, which consists of each functional module in the device shown in FIG. 8, a corresponding piece of metadata, and a heuristic algorithm 1110. These computer executable instruction sets may be executed by the processor 1101, so as to complete the method shown in FIG. 4, or functions of the device shown in FIG. 8. Alternatively, the application program 1108 may include an APP resource server module. The APP resource server module may include a computer executable instruction set 1109, which consists of each functional module in the device shown in FIG. 9, a corresponding piece of metadata, and a heuristic algorithm 1110. These computer executable instruction sets may be executed by the processor 1101, so as to complete the method shown in FIG. 4, or functions of the device shown in FIG. 9.

In the embodiment, the network communication interface 1104 cooperates with the network communication module 1106, so as to receive and transmit each network signal of the server device, e.g., interact network data with another server, or interact network data with the terminal, and so on.

In addition, each embodiment of the present disclosure may be implemented by a data processing device, such as, a data processing program executed by a computer. It is obvious that, the data processing program constitutes the present disclosure. In addition, a data processing program generally stored in a storage medium is executed, by reading the program from the storage medium, or installing the program, or copying the program to the storage device (such as, hard disk, and/or, memory) of the data processing device. Thus, such storage medium also constitutes the present disclosure. The storage medium may adopt any type of record mode, e.g., a paper storage medium (such as, paper tape), a magnetic storage medium (such as, soft disk, hard disk, flash memory), an optical storage medium (such as, compact disk (CD)-Read-only memory (ROM)), a magneto-optical (MO) storage medium (such as, MO), and so on.

Thus, the present disclosure also provides a storage medium, which stores a data processing program. The data processing program is configured to execute any foregoing method embodiment in the present disclosure.

Thus, it can be seen that, in the embodiments of the present disclosure, an account management server is configured to uniformly manage account information of a terminal device, and reply to the authentication request put forward by the terminal device for each APP resource server, after the terminal device completes register. The account management server is further configured to allocate a corresponding authentication ticket for the terminal device. Subsequently, the terminal device may access a corresponding APP resource server, based on the authentication ticket. Each corresponding APP resource server transmits the authentication ticket to the account management server to be verified. After the verification is passed, the APP resource server returns the APP resource to the terminal device. It is not necessary for each APP resource server to respectively maintain a register account of the terminal device. The terminal device does not need to respectively log on each APP resource server. That is, multiple APP platforms adopt the same login system, and a cross-platform login has been achieved. Login operations of a user may be simplified and unified, thereby reducing maintenance costs and development costs. In addition, for a terminal device possessing social relationship data, the social relationship data may be directly used, so as to facilitate a user to share information of the user. Besides, after identifying a user with the same user ID and reporting user information, data report, data statistics and data analysis may be facilitated. Subsequently, deep demand of the user may be further found, product experience may be improved, and market competitiveness may also be enhanced.

The foregoing contents are only preferred embodiments of the present disclosure, which are not for use in limiting the present disclosure. Any modifications, equivalent substitutions and improvements made within the spirit and principle of the present disclosure, should be covered by the protection scope of the present disclosure.

The invention claimed is:

1. A method for sharing a cross-platform account resource, which is applied to a terminal device, comprising:
   interacting with an account management server, and completing a register account on the account management server, wherein register information of the register account comprises a user name and a password;
   transmitting an authentication request to the account management server, based on the register account of the account management server, wherein the authentication request carries the user name, the password, and an ID of an APP resource server;
receiving an authentication ticket corresponding to the APP resource server from the account management server, and storing the authentication ticket, wherein the authentication ticket carries a user ID, an authorization key and a refresh key;
before transmitting a resource request to the APP resource server based on the user ID and the authorization key in the authentication ticket, determining whether the authentication ticket corresponding to the APP resource server is stored in the terminal device;
when determining that the authentication ticket corresponding to the APP resource server is stored in the terminal device, transmitting the resource request to the APP resource server based on the user ID and the authorization key in the authentication ticket;
when determining that the authentication ticket corresponding to the APP resource server is not stored in the terminal device, transmitting the authentication request carrying the user name, the password and the ID of the APP resource server to the account management server, or, transmitting a register request to the account management server;
receiving an APP resource from the APP resource server, after the account management
server receives a verification request carrying the user ID and the authorization key from the APP resource server, verifies the authentication ticket by using the user ID and the authorization key, and confirms that the user ID and the authorization key are valid;
wherein the method further comprises:
after the APP resource server requests the account management server to verify the authentication ticket by using the user ID and the authorization key, receiving a ticket error indication from the APP resource server;
on the basis of the ticket error indication, transmitting a ticket refresh request carrying the user ID and the refresh key to the account management server, or transmitting the authentication request carrying the user name, the password and the ID of the APP resource server to the account management server; and,
receiving the authentication ticket carrying the user ID, a new authorization key and a new refresh key from the account management server, and storing the authentication ticket.

2. The method according to claim 1, wherein a valid period is respectively set for the authorization key and the refresh key in the authentication ticket, the valid period of the refresh key is longer than the valid period of the authorization key;
wherein the method further comprises:
after determining that the authentication ticket corresponding to the APP resource server is stored in the terminal device, and before transmitting the resource request to the APP resource server based on the user ID and the authorization key in the authentication ticket, determining whether the authorization key of the authentication ticket is within the valid period, when determining that the authorization key is within the valid period, transmitting the resource request to the APP resource server based on the user ID and the authorization key in the authentication ticket;
when determining that the authorization key is not within the valid period, determining whether the refresh key in the authentication ticket is within the valid period,
when the refresh key is within the valid period, transmitting a ticket refresh request carrying the user ID and the refresh key to the account management server, receiving the authentication ticket corresponding to the APP resource server from the account management server, and storing the authentication ticket, wherein the authentication ticket carries the user ID, the authorization key and the refresh key;
when the refresh key is not within the valid period, transmitting the authentication request carrying the user name, the password, and the ID of the APP resource server to the account management server.

3. A method for sharing a cross-platform account resource, which is applied to an account management server, comprising:
receiving a register request from a terminal device, wherein the register request carries register information of a user name and a password;
storing a register account corresponding to the register information, and returning a register complete indication to the terminal device;
receiving an authentication request from the terminal device, wherein the authentication request carries the user name, the password, and an ID of an APP resource server;
when determining that the register account with the user name and the password is stored in the account management server, generating an authentication ticket corresponding to the APP resource server for the terminal device, storing the authentication ticket and returning the authentication ticket to the terminal device, wherein the authentication ticket carries a user ID, an authorization key and a refresh key;
receiving a verification request from the APP resource server, wherein the verification request carries the user ID and the authorization key;
verifying the user ID and the authorization key, by using the corresponding authentication ticket stored in the account management server;
when the user ID and the authorization key are valid, confirming that a verification is passed; otherwise, confirming that the verification is failed; and, returning a verification result to the APP resource server;
wherein the method further comprises:
receiving a ticket refresh request from the terminal device, wherein the ticket refresh request carries the user ID and the refresh key;
verifying the user ID and the refresh key, by using the corresponding authentication ticket stored in the account management server;
when the user ID and the refresh key are valid, generating the authentication ticket corresponding to the APP resource server for the terminal device, wherein the authentication ticket carries the user ID, a new authorization key and a new refresh key;
storing the authentication ticket, and returning the authentication ticket to the terminal device;
wherein a valid period is respectively set for the authorization key and the refresh key in the authentication ticket, the valid period of the refresh key is longer than the valid period of the authorization key;
wherein verifying the user ID and the authorization key, by using the corresponding authentication ticket stored in the account management server comprises:
comparing the user ID and the authorization key with the user ID and the authorization key in the corresponding authentication ticket stored in the account management server, when they are the same, and the authorization key is within the valid period, confirming that the user ID and the authorization key are valid; otherwise, confirming that the user ID and the authorization key are invalid;

wherein verifying the user ID and the refresh key, by using the corresponding authentication ticket stored in the account management server, comprises:

comparing the user ID and the refresh key with the user ID and the refresh key in the corresponding authentication ticket stored in the account management server, when they are the same, and the refresh key is within the valid period, confirming that the user ID and the refresh key are valid; otherwise, confirming that the user ID and the refresh key are invalid.

4. A device for sharing a cross-platform account resource, which is applied to a terminal device, comprising a processor and a memory; wherein the memory stores application program modules executable by the processor, and the application program modules comprise a register request transmitting module, a register result receiving module, an authentication request transmitting module, an authentication ticket receiving module, a resource request transmitting module, a resource feedback receiving module and a storing module, the register request transmitting module is configured to transmit a register request to an account management server, wherein the register request carries register information of a user name and a password; and, the register result receiving module is configured to receive register result information from the account management server;

the authentication request transmitting module is configured to transmit an authentication request to the account management server, based on a register account on the account management server, wherein the authentication request carries the user name, the password, and an ID of an APP resource server;

the authentication ticket receiving module is configured to receive an authentication ticket corresponding to the APP resource server from the account management server, and store the authentication ticket into the storing module, wherein the authentication ticket carries a user ID, an authorization key and a refresh key;

the storing module is configured to store an authentication ticket corresponding to each APP resource server;

the resource request transmitting module is configured to transmit a resource request to the APP resource server, based on the user ID and the authorization key in the authentication ticket; and, the resource feedback receiving module is configured to receive an APP resource from the APP resource server, after the account management server receives a verification request carrying the user ID and the authorization key from the APP resource server, verifies the authentication ticket by using the user ID and the authorization key, and confirms that the user ID and the authorization key are valid;

wherein the resource feedback receiving module is further configured to receive a ticket error indication from the APP resource server, after the APP resource server requests the account management server to verify the authentication ticket by using the user ID and the authorization key;

on the basis of the ticket error indication, the resource feedback receiving module is further configured to indicate the authentication request transmitting module to transmit the authentication request, or indicate the ticket refresh request transmitting module to transmit the ticket refresh request;

wherein the device further comprises a ticket detecting module, the ticket detecting module is configured to determine whether the authentication ticket corresponding to the APP resource server is stored in the terminal device, before the resource request transmitting module transmits the resource request to the APP resource server;

when determining that the authentication ticket corresponding to the APP resource server is stored in the terminal device, the ticket detecting module is further configured to indicate the resource request transmitting module to transmit the resource request to the APP resource server;

when determining that the authentication ticket corresponding to the APP resource server is not stored in the terminal device, the ticket detecting module is further configured to indicate the authentication request transmitting module to transmit the authentication request to the account management server, or indicate the register request transmitting module to transmit the register request to the account management server.

5. The device according to claim 4, wherein the device further comprises a ticket refresh request transmitting module, which is configured to transmit a ticket refresh request carrying the user ID and the refresh key to the account management server, so as to request the account management server to re-transmit the authentication ticket.

6. The device according to claim 4, wherein a valid period is respectively set for the authorization key and the refresh key in the authentication ticket, the valid period of the refresh key is longer than the valid period of the authorization key;

after determining that the authentication ticket corresponding to the APP resource server is stored in the terminal device, and before indicating the resource request transmitting module to transmit the resource request to the APP resource server, the ticket detecting module is further configured to determine whether the authorization key of the authentication ticket is within the valid period; when the authorization key is within the valid period, the ticket detecting module is further configured to indicate the resource request transmitting module to transmit the resource request to the APP resource server;

when the authorization key is not within the valid period, the ticket detecting module is further configured to determine whether the refresh key is within the valid period, when the refresh key is within the valid period, the ticket detecting module is further configured to indicate the ticket refresh request transmitting module to transmit the ticket refresh request to the account management server; when the refresh key is not within the valid period, the ticket detecting module is further configured to indicate the authentication request transmitting module to transmit the authentication request to the account management server.

7. A device for sharing a cross-platform account resource, which is applied to an account management server, comprising a processor and a memory, wherein the memory stores application program modules executable by the processor, and the application program modules comprise a register interface module, a storing module, an authentication request receiving module, an authentication ticket generating module, an authentication ticket transmitting module, a verification request receiving module, a verification processing module and a verification result transmitting module, wherein the register interface module is configured to receive a register request from a terminal device, wherein the register request comprises register information of a user name and a password;

the register interface module is further configured to store a register account corresponding to the register information into the storing module, and return a register complete indication to the terminal device;

the storing module is configured to store the register account of the terminal device, and an authentication ticket corresponding to each APP resource server, wherein the register account comprises the user name and the password;

the authentication request receiving module is configured to receive an authentication request from the terminal device, wherein the authentication request carries the user name, the password and an ID of an APP resource server;

when determining that the storing module stores the register account carrying the user name and the password, the authentication ticket generating module is configured to generate an authentication ticket corresponding to the APP resource server for the terminal device, and store the authentication ticket into the storing module, wherein the authentication ticket carries a user ID, an authorization key and a refresh key;

the authentication ticket transmitting module is configured to transmit the authentication ticket to the terminal device, wherein the authentication ticket is generated by the authentication ticket generating module;

the verification request receiving module is configured to receive a verification request from the APP resource server, wherein the verification request carries the user ID and the authorization key;

the verification processing module is configured to verify the user ID and the authorization key, by using the corresponding authentication ticket stored in the account management server, when the user ID and the authorization key are valid, the verification processing module is further configured to confirm that a verification is passed; when the user ID and the authorization key are invalid, the verification processing module is further configured to confirm that the verification is failed; and the verification result transmitting module is configured to transmit a verification result to the APP resource server, wherein the verification result is obtained by the verification processing module;

wherein the device further comprises a ticket refresh request receiving module, which is configured to receive a ticket refresh request from the terminal device, wherein the ticket refresh request carries the user ID and the refresh key;

the verification processing module is further configured to verify the user ID and the refresh key, by using the corresponding authentication ticket stored in the account management server; when the user ID and the refresh key are valid, the verification processing module is further configured to indicate the authentication ticket generating module to re-generate the authentication ticket for the terminal device.

8. The device according to claim 7, wherein a valid period is respectively set for the authorization key and the refresh key of the authentication ticket, the valid period of the refresh key is longer than the valid period of the authorization key;

when verifying the user ID and the authorization key, by using the corresponding authentication ticket stored in the account management server, the verification processing module is further configured to compare the user ID and the authorization key with the user ID and the authorization key in the corresponding authentication ticket stored in the account management server, when they are the same, and the authorization key is within the valid period, the verification processing module is further configured to confirm that the user ID and the authorization key are valid; otherwise, the verification processing module is further configured to confirm that the user ID and the authorization key are invalid;

when verifying the user ID and the refresh key, by using the corresponding authentication ticket stored in the account management server, the verification processing module is further configured to compare the user ID and the refresh key with the user ID and the refresh key in the corresponding authentication ticket stored in the account management server, when they are the same, and the refresh key is within the valid period, the verification processing module is further configured to confirm that the user ID and the refresh key are valid; otherwise, the verification processing module is further configured to confirm that the user ID and the refresh key are invalid.

* * * * *